9224X
L. P. Clark,
Cracker Machine,
Patented Nov. 7, 1835
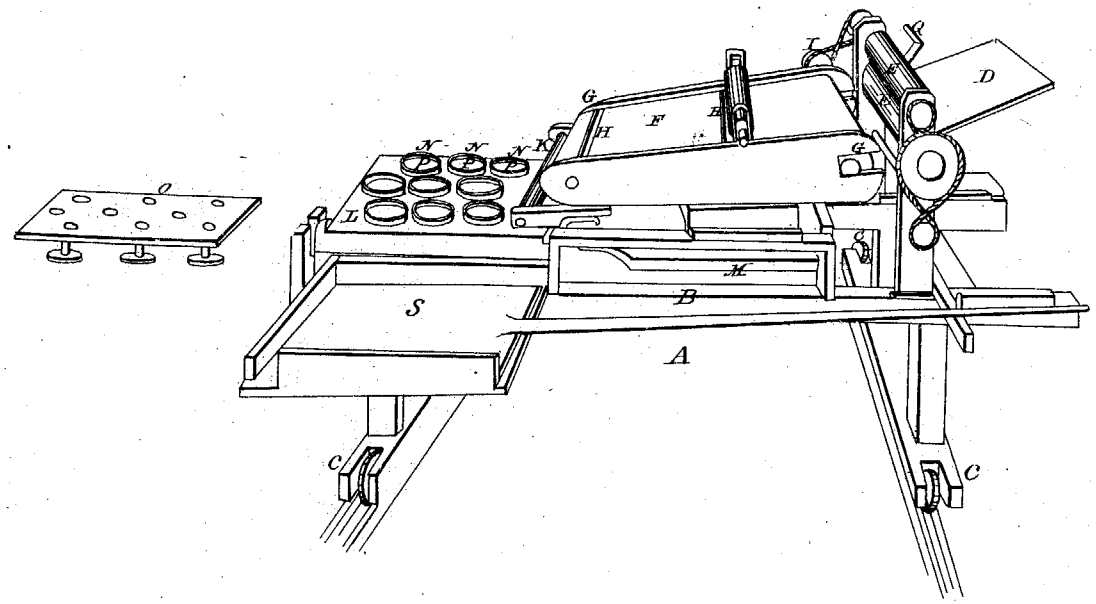
N. PETERS, PHOTO-LITHOGRAPHER, WASHINGTON, D. C.

Nov 7. 1835

Levin P. Clark

9224X Letters Patent

The Schedule refered to in these Letters Patent and making part of the same containing a description in the words of the said Levin P. Clark himself of his improvement in the Machine for cutting crackers and biscuits.

---

Be it known that I Levin P. Clark of the City of Baltimore in the County of Baltimore and state of Maryland have made an improvement in the useful arts, being a machine for making crackers which is described as follows, reference being had to the annexed drawings of the same making part of this specification.

A is a perspective view of the whole machine as in operation, composed of a frame running on a rail way on four flanged wheels, a hopper or inclined board for the dough two fastening rollers through which the dough passes, a revolving apron, with cutters to cut the dough into proper lengths and for conveying it to the moulds, two conical pulleys to propel the apron, a roller to turn the dough down upon the moulds a moulding plate turning on journals with cutters or caps to cut the dough the dough into cakes or crackers, moulds, cutters or cups, relief plate and docker, the pullies and connecting bands.

B. the frame which may be composed of any suitable number of pieces of wood of required dimensions and strength, C, flanged wheels upon which it turns on a rail way constructed in front of the oven, D, the hopper or inclined board upon which the dough is placed, E, the two flattening rollers, placed at the end of the inclined board through which the dough is drawn and brought to the required thickness for cakes etc. F. the revolving apron made of leather and passed around the drums G, being sewed together at the ends forming an endless band or apron, and having four or more iron cutters. H. fastened to it to cut the dough. I. the conical pulleys, on the ends of the drums grooved for the bands which connect them for moving the apron, K, K. the roller for turning the dough upon the moulds and for pressing
the dough into the moulds; this roller is placed under the revolving
apron at the lower end of the same. L. the moulding plate turn-
ing on journals at the end of the revolving apron, having a balance
beam M, or spring N. the moulds or cutters made of metal and
bevelling inside in order to cut the crackers with smooth edges &
to discharge the moulds easily. O. the relief plate and pistons
P. worked in this mould to discharge the crackers from the moulds.
Q. the crank handle on the end of the shaft by which the machine
is put in Motion.

Pulleys and Bands for connecting and moving the rol-
lers. The operation of this Machine is as follows. The dough being
placed upon the inclined board & the machine put in motion by
turning the crank handle the dough is drawn in between the
rollers [illegible] E. where it is brought to a proper thickness for crackers
or cakes from these rollers it is received on the revolving apron F. and
as it passes under the roller R, it is cut into proper lengths for the
moulding plate, and when it arrives at the end of the revolving apron,
it is met by the roller K. and turned over upon the moulds, the
roller passing over it and pressing the dough into the moulds, the
surplus dough being removed by the hand, the moulding plate
moving upon journals and with the aid of the balance or spring
is now turned over upon the peel or shovel S. the relief plate and
pistons discharging the crackers from the moulds upon the peel or
shovel; the moulding plate is returned to its former position and
the cakes are placed in the oven by the peel, In this manner the
operation is continued. What I claim as original and as my in-
vention and which I desire to secure by Letters Patent consists in
the combination & arrangement of the parts of the machine for mak-
ing biscuits & crackers, and the mode of operating the same and trans-
porting the machine from Oven to Oven on the rail ways, but I
Exd. particularly claim the roller for turning the dough on the moulds,
W.H: the balance moulding plate and the manner of peeling as before
described Witnesses. Henry Suter Jr.
John I Keys Levin P. Clark

[1835. Nov. 7.]

(Drawing)

819